(12) United States Patent
Kurokawa et al.

(10) Patent No.: US 8,465,822 B2
(45) Date of Patent: Jun. 18, 2013

(54) OPTICAL RECORDING MEDIUM

(75) Inventors: Kotaro Kurokawa, Kanagawa (JP); Shigeki Takagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 13/183,704

(22) Filed: Jul. 15, 2011

(65) Prior Publication Data

US 2012/0027980 A1     Feb. 2, 2012

(30) Foreign Application Priority Data

Jul. 29, 2010   (JP) ................................. 2010-170885

(51) Int. Cl.
  *G11B 7/24*   (2006.01)

(52) U.S. Cl.
  USPC ....... 428/64.1; 428/64.4; 428/64.5; 428/64.6; 430/270.13

(58) Field of Classification Search
  USPC ..................................... 428/64.4; 430/270.13
  See application file for complete search history.

(56) References Cited

U.S. PATENT DOCUMENTS

2007/0178272 A1   8/2007   Nakai et al.
2010/0047504 A1   2/2010   Nishihara et al.

FOREIGN PATENT DOCUMENTS

JP    2002-269826   9/2002
WO    2008/018225   2/2008

OTHER PUBLICATIONS

European Search Report dated Nov. 17, 2011 in connection with counterpart EP Application No. EP 11 17 2437.

*Primary Examiner* — Elizabeth Mulvaney
(74) *Attorney, Agent, or Firm* — Dentons US LLP

(57) ABSTRACT

An optical recording medium includes a support substrate and a semi-transmissive recording layer. The semi-transmissive recording layer includes a first dielectric layer, a semi-transmissive semi-reflective layer, a second dielectric layer, a phase change recording material layer, and a third dielectric layer that are sequentially stacked in that order on the support substrate. The semi-transmissive semi-reflective layer contains silver. The second dielectric layer has a stack structure including a lower layer disposed at the interface on the semi-transmissive semi-reflective layer side and an upper layer disposed on the phase change recording material layer side of the lower layer. The lower layer is composed of indium oxide or a composite oxide of indium oxide and tin oxide. The upper layer is composed of tantalum oxide, gallium oxide, zirconium oxide, or niobium oxide.

3 Claims, 4 Drawing Sheets

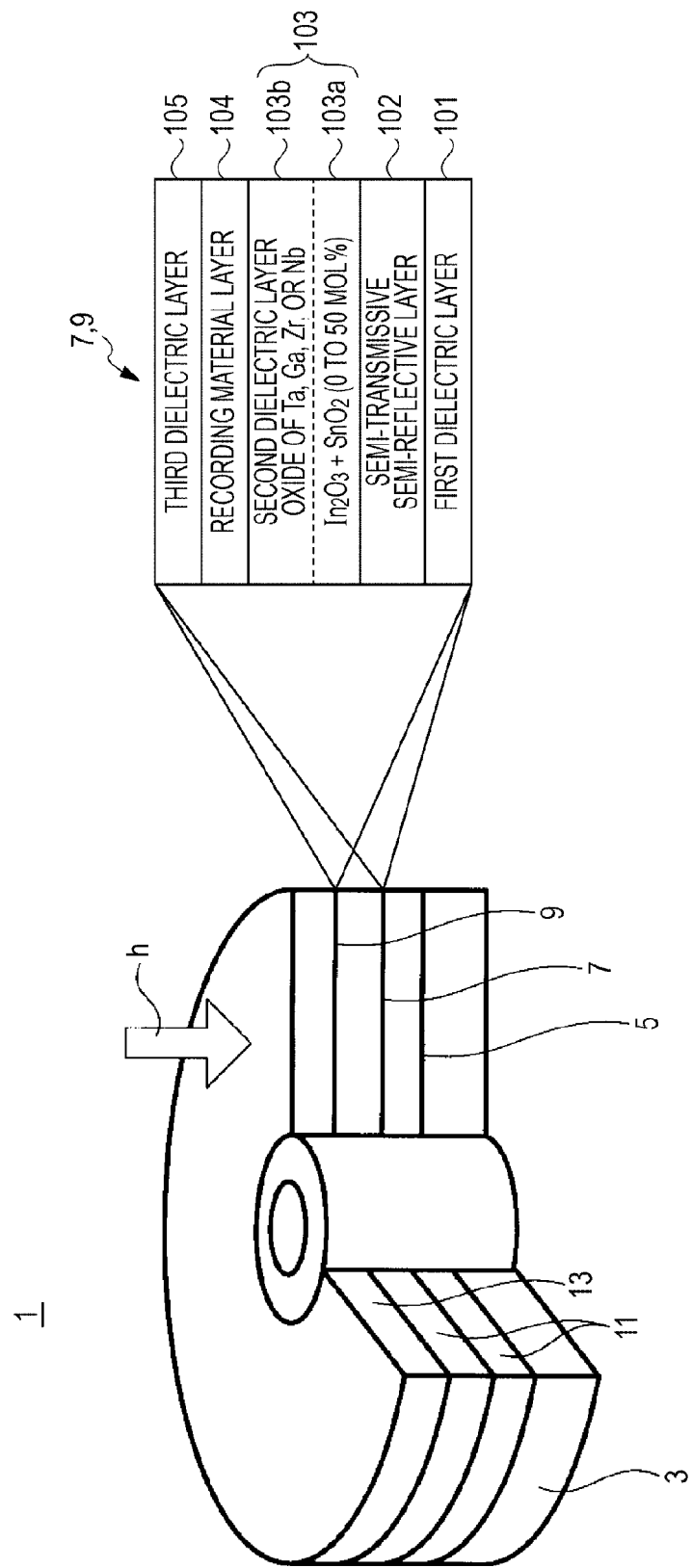

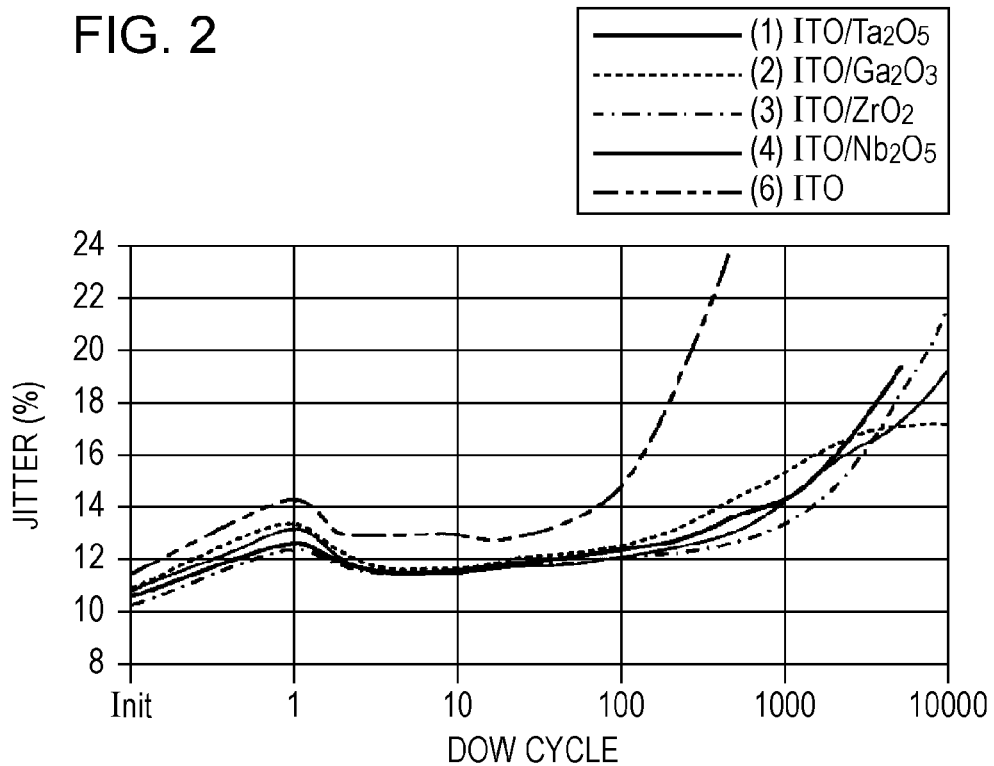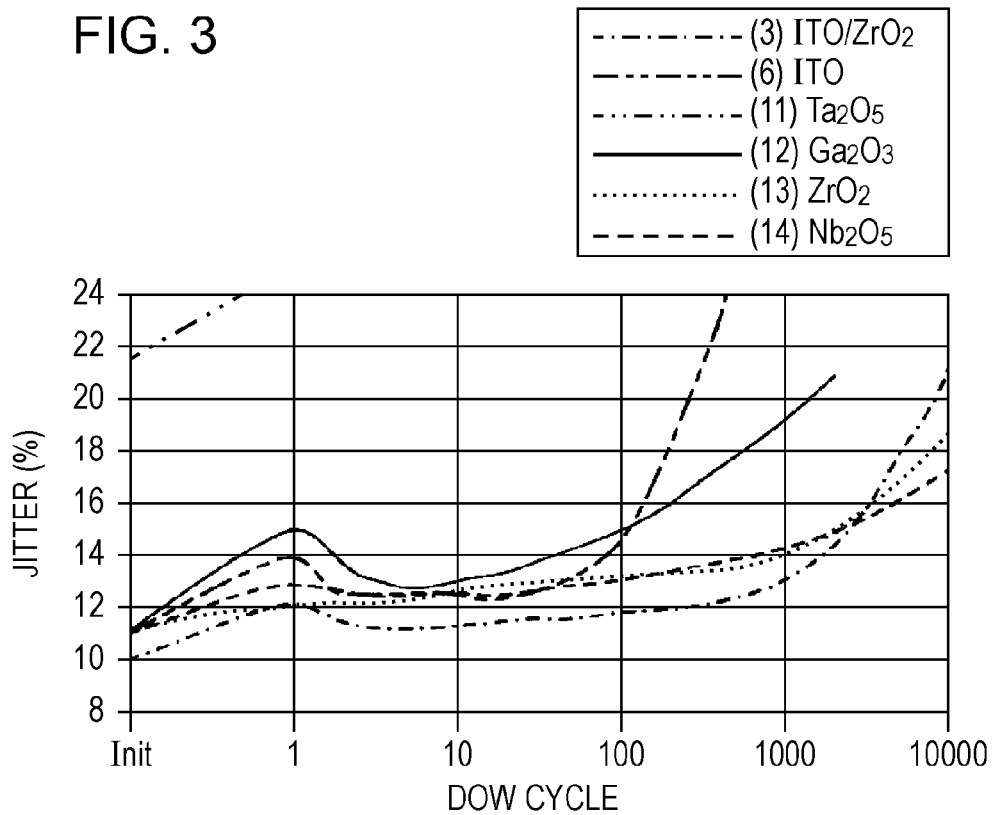

OPTICAL RECORDING MEDIUM

BACKGROUND

The present disclosure generally relates to optical recording media. In particular, it relates to a phase change optical recording medium including a plurality of stacked recording layers.

Phase change optical recording media are a type of optical recording media on which information can be recorded, read, and erased by irradiation with a laser beam. Information is recorded, read, and erased on a phase change optical recording medium by utilizing the crystal-amorphous phase change or the phase change between different crystal phases. Examples of the phase change optical recording media available in the market include rewritable compact disc (CD-RW), rewritable digital versatile disc (DVD-RW), digital versatile disc-random access memory (DVD-RAM), and Blu-ray disc. To meet recent demand for a higher storage capacity, media that include a stack of two or more recording layers (e.g., dual layer disc) has been introduced.

An example of the structure of a dual layer disc of a phase change optical recording medium type is as follows. A first recording layer is formed on a support substrate, a second recording layer is formed on the first recording layer with an intermediate layer transparent to the read/write wavelength therebetween, and a light-transmitting protective layer transparent to the read/write wavelength is disposed on the second recording layer. The laser beam used in recording and reading is incident on an optical recording medium through an object lens on the light-transmitting protective layer side. The laser beam passing through the object lens is focused on a first recording layer or a second recording layer to record and read information.

The feature of a dual layer disc is that the second recording layer is configured as a semi-transmissive recording layer having an ability to transmit light so that reading and writing can be conducted on the first recording layer. The second recording layer is made by stacking a dielectric material, a metal, a phase change recording material, etc., so that read and write functions can be performed. A typical stack structure include a first dielectric layer, a metal reflective layer, a second dielectric layer, a phase change recording material layer, and a third dielectric layer that are stacked in that order from the substrate side. A light transmittance of about 45% to 55% is imparted so that the read/write power and the reflectance are the same between the first recording layer and the second recording layer when viewed from an optical disc read/write device (drive).

In the second recording layer (semi-transmissive recording layer) having such a configuration, the second dielectric layer between the metal reflective layer and the phase change recording material layer has a function of increasing the absorption efficiency of the recording layer by adjusting the optical distance and a function of increasing the signal amplitude by increasing the change in amount of reflected light between before and after recording.

An oxide, a nitride, a sulfide, a carbide, a fluoride, carbon, etc., are used alone or in combination as a mixture as the material constituting this second dielectric layer. The second dielectric layer may have a stack structure combining these materials. In particular, International Publication WO2008/018225 proposes that the interface layer on the recording layer side contain an oxide such as indium oxide ($In_2O_3$), chromium oxide ($Cr_2O_3$), or gallium oxide ($Ga_2O_3$), and silicon.

SUMMARY

In order to further increase the storage capacity of optical recording media, three-layer discs having three recording layers and four-layer discs having four recording layers are being developed. In three-layer and four-layer discs, a semi-transmissive recording layer disposed on the laser beam incident side desirably has a light transmittance higher that that of a semi-transmissive recording layer of a dual layer disc.

In order to achieve such a high light transmittance, the thickness of the phase change recording material layer and the metal reflective layer constituting the semi-transmissive recording layer has been decreased. However, thickness reduction of these layers has reached its limit, and further thickness reduction will lead to generation of defects and deterioration of read/write signal characteristics.

It is desirable to provide an optical recording medium with a further increased storage capacity by suppressing generation of defects while maintaining the read/write signal characteristics of semi-transmissive recording layers.

The phase change optical recording medium includes a plurality of stacked recording layers including a semi-transmissive recording layer. The optical recording medium includes a support substrate and a semi-transmissive recording layer. The semi-transmissive recording layer includes a first dielectric layer, a semi-transmissive semi-reflective layer, a second dielectric layer, a phase change recording material layer, and a third dielectric layer that are sequentially stacked in that order on the support substrate. In particular, silver is used in the semi-transmissive semi-reflective layer. The second dielectric layer has a stack structure including a lower layer disposed at the interface on the semi-transmissive semi-reflective layer side and an upper layer disposed on the phase change recording material layer side of the lower layer. Of these, the lower layer is composed of indium oxide or a composite oxide of indium oxide and tin oxide. In contrast, the upper layer is composed of tantalum oxide, gallium oxide, zirconium oxide, or niobium oxide.

It has been confirmed that, according to an optical recording medium having this structure, read/write signal characteristics of the semi-transmissive recording layer can be maintained and generation of defects can be suppressed as described in detail in embodiments and examples below since the stack structure of the second dielectric layer is limited as described above.

According to the present disclosure, in a phase change optical recording medium in which a plurality of recording layers including a semi-transmissive recording layer are stacked, the number of semi-transmissive recording layers stacked can be increased and the storage capacity can be further increased.

BRIEF DESCRIPTION OF THE DRAWINGS

FIG. 1 is a schematic diagram showing a structure of an optical recording medium according to an embodiment;

FIG. 2 is a graph showing DOW characteristics of optical recoding media in Example 1;

FIG. 3 is a graph showing DOW characteristics of optical recoding media in Example 2;

DETAILED DESCRIPTION OF EMBODIMENTS

Figure 4A:
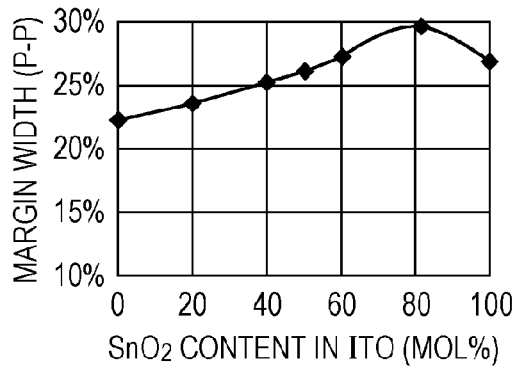
FIGS. 4A to 4D are graphs showing results of various evaluations on optical recording media in Example 3.

Embodiments will now be described in detail with reference to FIG. 1.

FIG. 1 is a schematic view showing a structure of an optical recording medium 1 according to an embodiment. The optical recording medium 1 shown in the drawing is a phase change optical recording medium including a stack of a plurality of recording layers including semi-transmissive recording layers. In this embodiment, among dielectric layers constituting the semi-transmissive recording layer, the second dielectric layer disposed between the recording material layer and the semi-transmissive semi-reflective layer has a characteristic structure. Although a structure including three recording layers stacked on one another is described as an example herein, the number of recording layers stacked is not limited to this. The number of recording layers may be two or four or more.

The optical recording medium 1 includes a support substrate 3, a plurality of recording layers 5, 7, and 9 stacked on the support substrate 3, transparent intermediate layers 11 respectively sandwiched between the recording layers 5, 7, and 9, and a transparent protective film 13 disposed on the top. The recording layers 5, 7, and 9 are a reflective recording layer 5 disposed immediately above the support substrate 3 and semi-transmissive recording layers 7 and 9 disposed on the transparent protective film 13-side of the reflective recording layer 5. In other words, the support substrate 3, the reflective recording layer 5, the intermediate layer 11, the semi-transmissive recording layer 7, the intermediate layer 11, the semi-transmissive recording layer 9, and the transparent protective film 13 are stacked in this order from the support substrate 3 side. When four or more recording layers are provided, semi-transmissive recording layers are stacked between the semi-transmissive recording layer 9 and the transparent protective film 13 with intermediate layers therebetween.

Reading and writing on the optical recording medium 1 is performed with a laser beam having a wavelength of, for example, 400 to 410 nm incident from the transparent protective film 13 side. A laser beam h output from a disc read/write device and incident from the transparent protective film 13 side is focused on the reflective recording layer 5 or the semi-transmissive recording layer 7 or 9 in response to focus control at the disc read/write device so as to read and write information. The structure of each layer is described below.

<Support Substrate 3>

The support substrate 3 is composed of plastic such as polycarbonate, glass, or the like.

<Reflective Recording Layer 5>

The reflective recording layer 5 includes a phase change recording material layer and a reflective layer having a thickness large enough to reflect the laser beam h for reading and writing. In the reflective recording layer 5, at least a reflective layer, a dielectric layer, a phase change recording material layer, and a dielectric layer are stacked in that order from the support substrate 3 side. The recording material layer may be any layer that uses a phase change recording material and is composed of a material selected from the same recording materials as those constituting the semi-transmissive recording layers 7 and 9 described next, for example.

<Semi-Transmissive Recording Layers 7 and 9>

The semi-transmissive recording layers 7 and 9 are layers that each have a second dielectric layer 103 characteristic of this embodiment. The semi-transmissive recording layers 7 and 9 each include a phase change recording material layer 104 and a semi-transmissive semi-reflective layer 102 that reflects and transmits the laser beam h for reading and writing. As illustrated in the drawing, the semi-transmissive recording layers 7 and 9 each include a first dielectric layer 101, the semi-transmissive semi-reflective layer 102, the second dielectric layer 103, the recording material layer 104, and a third dielectric layer 105 stacked in that order from the support substrate 3 side. In this embodiment, the structure of the second dielectric layer 103 disposed between the semi-transmissive semi-reflective layer 102 and the recording material layer 104 in the semi-transmissive recording layers 7 and 9 having such a stack structure is characteristic. The structure of the semi-transmissive recording layers 7 and 9 is described below from the lower layer side.

It has been proposed that the first dielectric layer 101 have a structure that uses a material having a particular refractive index as a layer for adjusting the transmittance. Examples of such materials include $TiO_2$, $ZrO_2$, $ZnO$, $Nb_2O_5$, $Ta_2O_5$, $SiO_2$, $Al_2O_3$, $Bi_2O_3$, Ti—N, Zr—N, Nb—N, Ta—N, Si—N, Ge—N, Cr—N, Al—N, Ge—Si—N, Ge—Cr—N, and ZnS. These materials may be used as a mixture or in a stack structure.

The semi-transmissive semi-reflective layer 102 is constituted by a metal thin film. Here, for example, a thin film containing silver (Ag) or a silver alloy is used and the transmittance for the laser beam, the reflectance, and the heat releasing rate are adjusted by adjusting the film thickness. When a silver alloy is used, the material other than silver (Ag) is, for example, Nd, Pd, or Cu.

The second dielectric layer 103 characteristic of the present disclosure has a stack structure that includes a lower layer 103a at the semi-transmissive semi-reflective layer 102 side and an upper layer 103b at the recording material layer 104 side, the upper layer 103b being provided above the lower layer 103a.

Of these, the lower layer 103a at the semi-transmissive semi-reflective layer 102 side is configured as a layer composed of indium oxide ($In_2O_3$) or a layer composed of a composite oxide (indium tin oxide, ITO) of indium oxide ($In_2O_3$) and tin oxide ($SnO_2$). When the lower layer 103a is composed of ITO, the composition ratio of tin oxide ($SnO_2$) to indium oxide ($In_2O_3$) is preferably that the tin oxide ($SnO_2$) content is 50 mol % or less.

The upper layer 103b stacked on the lower layer 103a composed of such a material is configured as a layer composed of tantalum oxide ($Ta_2O_5$), gallium oxide ($Ga_2O_3$), zirconium oxide ($ZrO_2$), or niobium oxide ($Nb_2O_5$).

The recording material layer 104 is composed of a material that undergoes phase transition by irradiation with a laser beam. In particular, the phase is controlled to crystalline or amorphous, or crystal 1 and crystal 2 by the cooling process subsequent to laser irradiation heating. Such a recording material layer 104 is composed of at least one of germanium (Ge), bismuth (Bi), antimony (Sb), and tellurium. As a specific example, compounds having compositions of $Ge_aSb_2Te_{a+3}$ and $Ge_aBi_2Te_{a+3}$ ($1 \leq a \leq 20$) are used. These compounds are used by delicately adjusting the amounts of germanium (Ge) and tellurium (Te) or as a composite compound formed by mixing the two materials. A recording material layer 104 composed of such a compound may further contain elements suitable for usage so as to improve the recorded information storage performance or the like.

The third dielectric layer 105 is composed of the same material as the first dielectric layer 101. The third dielectric layer 105 may be composed of a mixture of materials given as examples above, is not limited to having a single structure, and may have a layer structure in which a plurality of layers are stacked.

The semi-transmissive recording layers 7 and 9 have a capacity of transmitting light so that the laser beam for reading and writing incident from the transparent protective film 13 side reaches the reflective recording layer 5. In particular, the semi-transmissive recording layers 7 and 9 are designed to have the same read/write power and reflectance as the reflective recording layer 5 when viewed from a read/write device (drive) that performs laser beam irradiation and pickup. Accordingly, the semi-transmissive recording layers 7 and 9 are designed such that a layer closer to the transparent protective film 13 is configured to have a higher light transmittance.

For example, according to a structure in which three recording layers including the reflective recording layer 5 are stacked, the light transmittance of the semi-transmissive recording layer 7 at the support substrate 3 side is adjusted to about 45% to 55%, and that of the semi-transmissive recording layer 9 at the transparent protective film 13 side is adjusted to about 60%. Such adjustment is controlled through the film thickness of each layer such that the light transmittance tc of the laser beam h for reading and wiring, the reflectance Rc of the recording material layer 104 in a crystalline state, and the reflectance Ra of the recording material layer 104 in an amorphous state are at particular values.

The semi-transmissive recording layers 7 and 9 are formed by a series of sputter deposition, for example. A sputter deposition device used in the series of sputter deposition includes a load chamber, an unload chamber, and deposition chambers for forming layers constituting the semi-transmissive recording layers 7 and 9, the deposition chambers being sequentially arranged between the load chamber and the unload chamber. These chambers are connected so that the support substrate can be sequentially conveyed through the chambers while maintaining a vacuum atmosphere.

In forming the semi-transmissive recording layers 7 and 9 with such a sputter deposition device, the reflective recording layer 5 and the intermediate layer 11 are formed on the support substrate 3, and then layers from the first dielectric layer 101 to the third dielectric layer 105 are sequentially formed thereon in the respective deposition chambers. As a result, semi-transmissive recording layers 7 and 9 in which the layers from the first dielectric layer 101 to the third dielectric layer 105 are sequentially stacked from the support substrate 3 side are formed.

<Intermediate Layers 11 and Transparent Protective Film 13>

The intermediate layers 11 and the transparent protective film 13 are composed of a material that has a low absorption for the laser beam for reading and writing. For example, a photosetting resin or a glass or resin substrate bonded with a photosetting resin adhesive may be used. The structures of the intermediate layers 11 and the transparent protective film 13 in the optical recording medium 1 may be the same as or different from each other.

According to the optical recording medium 1 described herein, the second dielectric layer 103 is configured to have a stack structure of the lower layer 103a and the upper layer 103b, and the combination of the materials constituting the layers 103a and 103b is limited. It has been confirmed as described in Examples 1 to 5 below that generation of defects in the semi-transmissive recording layers 7 and 9 is suppressed and the read/write signal characteristic is maintained as a result. Accordingly, in the phase change optical recording medium 1, the light transmittance can be ensured even when a plurality of semi-transmissive recording layers 7 and 9 are stacked, and the storage capacity can be further increased.

Example 1

Semi-transmissive recording layers 7 and 9 having a structure described in the first embodiment but with various types of second dielectric layers 103 were formed on the assumption that a laser beam having a wavelength of 405 nm is used as a read/write wavelength. The semi-transmissive recording layers 7 and 9 were formed on intermediate layers 11 composed of a photosetting resin, and the top thereof was covered with a transparent protective film 13 composed of a photosetting resin to form an optical recording medium.

Each semi-transmissive recording layer was formed by using the following materials in that order from the support substrate side.
First dielectric layer 101: $Nb_2O_5$ (20 nm)
Semi-transmissive semi-reflective layer 102: Ag alloy (10 nm)
Second dielectric layer 103: refer to Table below
Recording material layer 104: GeBiTe recording material (6 nm)
Third dielectric layer 105: SiN (10 nm)/$TiO_2$ (refractive index: about 2.65, 16 nm)

Note that the GeBiTe recording material constituting the recording material layer 104 is a compound-system recording material and undergoes crystalline-amorphous phase transition by laser beam irradiation.

TABLE

| | Second dielectric layer 103 | | Reliability | |
|---|---|---|---|---|
| | Lower layer 103a | Upper layer 103b | Initial defect Defects/$mm^2$ | Defect increase rate Defects/$mm^2$/day |
| (1) | ITO ($SnO_2$ 40 mol %) | $Ta_2O_5$ | 0.15 | 0.07 |
| (2) | | $Ga_2O_3$ | 0.10 | 0.04 |
| (3) | | $ZrO_2$ | 0.08 | 0.01 |
| (4) | | $Nb_2O_5$ | 0.09 | 0.03 |
| (5) | | $SiO_2$ | 0.11 | 1.43 |
| (6) | | ITO ($SnO_2$ 40 mol %) | 0.07 | 0.02 |

Optical recording media prepared as such were subjected to a reliability test and the defect density before and after the test was measured. The reliability test was conducted in a environment at a temperature of 80° C. and a humidity of 85% by storing the media for 120 hours. The initial defect density and the defect increase rate measured are presented in Table.

The initial defect density is the number of defects immediately after formation of the semi-transmissive recording layers converted into a number per unit area. The defect increase rate is the rate of increase in number of defects per unit area between before and after the reliability test converted into a value per unit time (1 day). The number of defects used for calculating the initial defect density and the defect increase rate was measured with a defect counter (defect detector produced by Pulstec Industrial Co., Ltd.).

Table shows that the initial defect density of structure (6) in which the second dielectric layer 103 had an ITO single layer structure was the lowest, i.e., 0.07 [defects/$mm^2$], but those of structures (2) to (5) in which the second dielectric layer 103 had stack structures were also suppressed to 0.15 [defects/$mm^2$] or less. In contrast, the defect increase rate was particularly poor, i.e., 1.13 [defects/$mm^2$/day], only in structure (5) in which the upper layer 103b of the second dielectric layer 103 was composed of silicon oxide ($SiO_2$). This was a level at which even the tracking servo operation was unstable.

The results show that when the second dielectric layer 103 has a stack structure, the upper layer 103b on the lower layer 103a composed of ITO is to be composed of tantalum oxide ($Ta_2O_5$), gallium oxide ($Ga_2O_3$), zirconium oxide ($ZrO_2$), or niobium oxide ($Nb_2O_5$). In other words, the second dielectric layer 103 having a stack structure preferably takes structures (1) to (4) in Table. It has been confirmed that due to this structure, generation of defects can be suppressed to an extent comparable to the structure in which the second dielectric layer 103 has an ITO single layer structure.

Example 2

RF signals were recorded a plurality of times (direct overwrite: DOW) on the optical recording media prepared in Example 1 including second dielectric layers 103 having structures (1) to (4) and (6) with a defect increase rate below the decimal point. FIG. 2 is a graph showing DOW characteristics (RF signal overwrite characteristics) drawn by plotting jitter values representing the RF signal quality versus the number of times of recording (DOW cycles). Jitter values are statistical figures of deviations in actual signal levels with respect to the reproduced signal levels in the case where RF signals are accurately recorded. The larger the figure, the poorer the RF signal quality. The recording conditions were as follows: 1-7PP modulation, 132 Mbps channel bit rate, 57.26 nm channel bit length. Other basic specifications were in compliance with the Blu-ray format.

The DOW characteristics shown in FIG. 2 show that the jitter value of structure (6) in which the second dielectric layer 103 had an ITO single layer structure deteriorates rapidly after about 100 DOW cycles. In contrast, the jitter value of structures (1) to (4) in which the second dielectric layer 103 was constituted by the lower layer 103a composed of ITO and the upper layer 103b composed of the indicated material does not deteriorate significantly until the number of DOW cycles reaches a number larger than that of (6) in which the second dielectric layer 103 had an ITO single layer structure.

The jitter values of structures (1) to (4) were lower than that of (6) after the first DOW cycle.

This confirms that the signal characteristic is improved when the second dielectric layer 103 has a stack structure formed by stacking an upper layer 103b composed of an oxide film other than ITO on the ITO lower layer 103a compared to when the second dielectric layer 103 has an ITO single layer structure.

Example 3

As comparative examples, optical recording media including semi-transmissive recording layers 7 and 9 in which the second dielectric layer 103 had a single layer structure composed of a material (11) to (14) in FIG. 3 were prepared. The structures other than the second dielectric layer 103 were the same as in Example 1.

RF signals were recorded a plurality of times on the optical recording media having structures (11) to (14) prepared as such as in Example 2. FIG. 3 is a graph showing DOW characteristics (RF signal overwrite characteristics) drawn by plotting jitter values versus the number of times of recording (DOW cycles). For comparison, the DOW characteristic of structure (6) in which the second dielectric layer 103 had an ITO single layer structure and the DOW characteristic of structure (3) in which the second dielectric layer 103 had a stack structure corresponding to the embodiment described in Example 2 are also presented in FIG. 3.

The DOW characteristics in FIG. 3 show that according to structures (6) and (11) to (14) in which the second dielectric layer 103 had a single layer structure, the jitter value is higher than structure (3) in which the second dielectric layer 103 had a ITO/zirconium oxide ($ZrO_2$) stack structure, until about 1000 DOW cycles.

This confirms that the signal characteristic is improved when the second dielectric layer 103 has a stack structure formed by stacking another oxide film ($ZrO_2$) on the ITO lower layer 103a compared to when the second dielectric layer 103 is an oxide film having a single layer structure.

Example 4

Optical recording media having semi-transmissive recording layers 7 and 9 each including a second dielectric layer 103 having a stack structure constituted by a lower layer 103a composed of ITO and an upper layer 103b composed of tantalum oxide ($Ta_2O_5$) were prepared in which the tin oxide ($SnO_2$) content in ITO was varied in the range of 0 to 100 mol %. The structure other than the second dielectric layer 103 was identical to that of Example 1. The optical recording media were evaluated as shown in FIGS. 4A to 4D. In FIGS. 4A to 4D, ITO in the horizontal axis is indium oxide ($In_2O_3$) when the tin oxide ($SnO_2$) content is 0 mol % and is tin oxide ($SnO_2$) when tin oxide ($SnO_2$) content is 100 mol %.

FIG. 4A shows the evaluation results of power margin. Power margin is one of indicators that show ease of recording versus fluctuation of laser power during signal recording and is determined as follows. First, the laser power used for optimum RF signal recording is set as a reference and recording is conducted while varying the laser power in the range of 0.5 to 1.5 times the reference, thereby obtaining data indicating changes in jitter value. As described above, a jitter value is a statistical figure of deviation of actual signal level with respect to a reproduced signal level when RF signals are accurately recorded. The larger the jitter value, the poorer the RF signal quality. There is an upper limit value for jitter value at which data is no longer readable. In general, an upper limit reference value that suits the individual system is set. Here, the jitter value will increase (deteriorate) if the laser power during signal recording is increased or decreased from the optimum value. The upper limit jitter value is reached when the deviation from the optimum power reaches a certain extent irrespective of whether the power is decreased or increased. Accordingly, the power width of the laser power range in which the jitter value does not exceed the upper limit value is normalized with the optimum laser power value, and this normalized power width, i.e., the margin width of the laser power, is determined as a power margin. Here, the margin width is assumed to be satisfactory if it is 20% or more.

As shown in FIG. 4A, in the ITO composition constituting the lower layer 103a of the second dielectric layer 103, the margin width peaked at a tin oxide ($SnO_2$) content of 80 mol % and a margin width of 20% or more was observed throughout the entire composition range. This shows that the power margin is satisfactory as long as the lower layer 103a of the second dielectric layer 103 is composed of indium oxide ($In_2O_3$), ITO, or tin oxide ($SnO_2$).

Figure 4B:
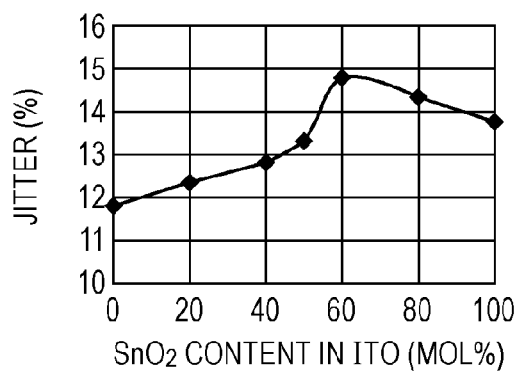

FIG. 4B shows the jitter values after 1000 DOW cycles. Here, a jitter value of 13.5% or more after 1000 DOW cycles is considered unsatisfactory.

As shown in FIG. 4B, in the ITO composition constituting the lower layer 103a of the second dielectric layer 103, the jitter value peaked at a tin oxide ($SnO_2$) content of 60 mol % and the jitter value is suppressed to less than 13.5% in the range of 50 mol % or less. This shows that the jitter value is satisfactory as long as the lower layer 103a of the second dielectric layer 103 is composed indium oxide ($In_2O_3$) or ITO having a tin oxide ($SnO_2$) content of 50 mol % or less. The jitter value at 10 DOW cycles was about 12% regardless of the composition ratio.

Figure 4C:
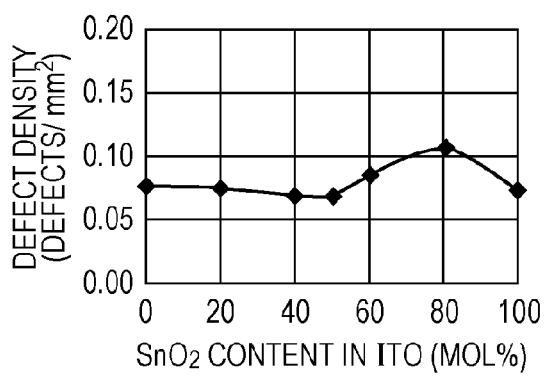

FIG. 4C shows initial defect densities indicating the number of defects immediately after fabrication of the optical recording medium in terms of an area density. Here, an initial defect density of 0.10 [defects/mm$^2$] or less is considered satisfactory.

As shown in FIG. 4C, in the ITO composition constituting the lower layer 103a of the second dielectric layer 103, the initial defect density is suppressed to 0.10 [defects/mm$^2$] or less when the tin oxide (SnO$_2$) content is in the range of 70 mol % to 85 mol %. This shows that the initial defect density is satisfactory as long as the tin oxide (SnO$_2$) content is 70 mol % to 85 mol %.

Figure 4D:
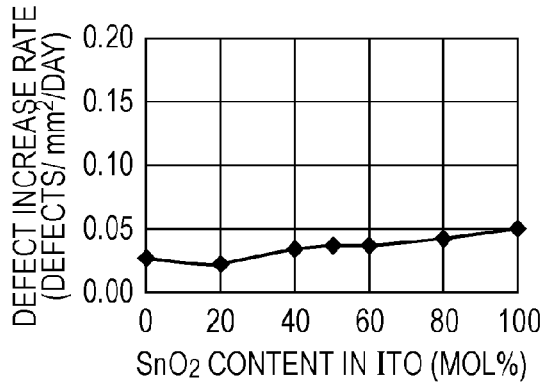

FIG. 4D shows a defect increase rate determined by calculating the increase in number of defects after the accelerated test on the optical recording medium as a defect increment per unit area and unit accelerated time (1 day). The accelerated test was performed by placing the optical recording medium in an 80° C., 85% environment for 120 hours. Here, a defect increase rate of 0.05 [defects/mm$^2$/day] or less is considered satisfactory.

As shown in FIG. 4D, in the ITO composition constituting the lower layer 103a of the second dielectric layer 103, the defect increase rate is suppressed to 0.05 [defects/mm$^2$/day] or less throughout the entire range of tin oxide (SnO$_2$) content. This shows that the defect increase rate is satisfactory as long as the lower layer 103a of the second dielectric layer 103 is composed of indium oxide (In$_2$O$_3$), ITO, or tin oxide (SnO$_2$).

The evaluations shown FIGS. 4A to 4D confirmed that the lower layer 103a of the second dielectric layer 103 is preferably composed of indium oxide (In$_2$O$_3$) or ITO having a tin oxide (SnO$_2$) content of 50 mol % or less from the standpoint of jitter value. Note that the upper layer 103b of the second dielectric layer 103 here is composed of tantalum oxide (Ta$_2$O$_5$).

Example 5

Optical recording media having semi-transmissive recording layers 7 and 9 each including a second dielectric layer 103 having a stack structure constituted by a lower layer 103a composed of ITO and an upper layer 103b composed of gallium oxide (Ga$_2$O$_3$) were prepared in which the tin oxide (SnO$_2$) content in ITO was varied in the range of 0 to 100 mol %. The structure other than the second dielectric layer 103 was identical to that of Example 1. The optical recording media were evaluated as in Example 4 as shown in FIGS. 5A to 5D. In FIGS. 5A to 5D, ITO in the horizontal axis is indium oxide (In$_2$O$_3$) when the tin oxide (SnO$_2$) content is 0 mol % and is tin oxide (SnO$_2$) when tin oxide (SnO$_2$) is 100 mol %.

Figure 5A:
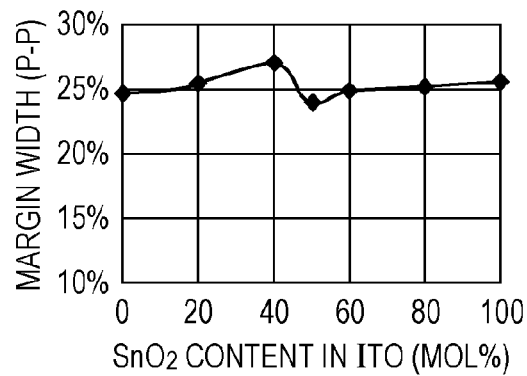
FIGS. 5A to 5D are graphs showing results of various evaluations on optical recording media in Example 4.

FIG. 5A shows the evaluation results for power margin. Here, a margin width of 20% or more is considered satisfactory. As shown in FIG. 5A, the margin width was about 25% throughout the entire range of tin oxide (SnO$_2$) content. This shows that the power margin is satisfactory as long as the lower layer 103a of the second dielectric layer 103 is composed of indium oxide (In$_2$O$_3$), ITO, or tin oxide (SnO$_2$).

Figure 5B:
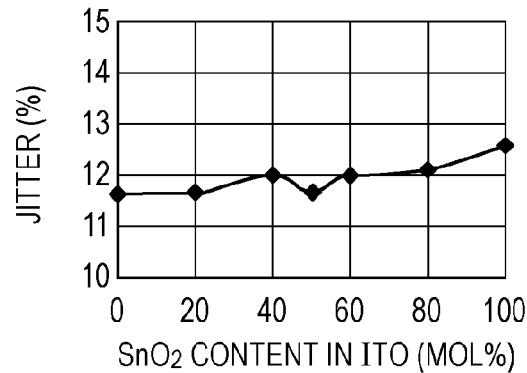

FIG. 5B shows the jitter values after 1000 DOW cycles. Here, a jitter value of 13.5% or more after 1000 DOW cycles is considered unsatisfactory. As shown in FIG. 5B, the jitter value was less than 13.5% throughout the entire range of the tin oxide (SnO$_2$) content. This shows that the jitter value is satisfactory as long as the lower layer 103a of the second dielectric layer 103 is composed of indium oxide (In$_2$O$_3$), ITO, or tin oxide (SnO$_2$).

Figure 5C:
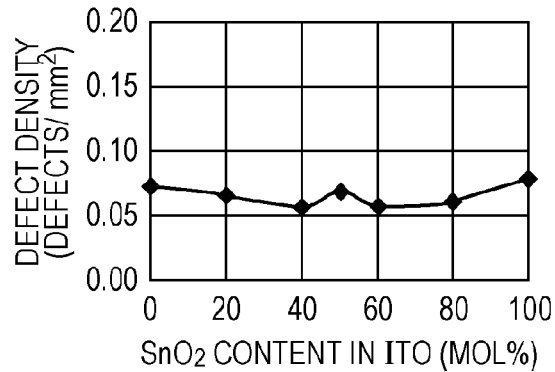

FIG. 5C shows the initial defect density. Here, an initial defect density of 0.10 [defects/mm$^2$] or less is considered satisfactory. As shown in FIG. 5C, the initial defect density was 0.10 [defects/mm$^2$] or less throughout the entire range of tin oxide (SnO$_2$) content. This shows that the initial defect density is satisfactory as long as the lower layer 103a of the second dielectric layer 103 is composed indium oxide (In$_2$O$_3$), ITO, or tin oxide (SnO$_2$).

Figure 5D:
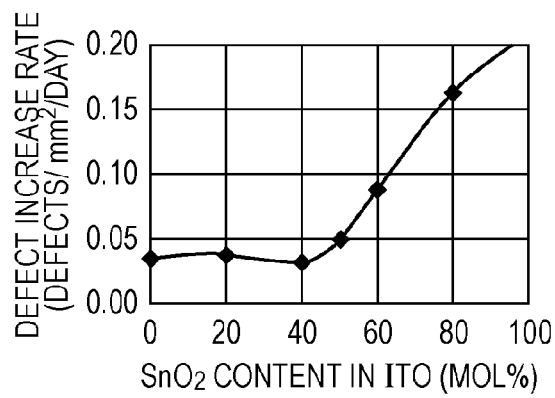

FIG. 5D shows the defect increase rate between before and after an accelerated test in a 80° C., 85% environment for 120 hours. Here, a defect increase rate of 0.05 [defects/mm$^2$/day] or less is considered satisfactory. As shown in FIG. 5D, the defect increase rate is suppressed to 0.05 [defects/mm$^2$/day] or less in the tin oxide (SnO$_2$) content range of 50 mol % or less. This shows that the defect increase rate is satisfactory as long as the lower layer of the second dielectric layer 103 is composed of indium oxide (In$_2$O$_3$), or ITO having a tin oxide (SnO$_2$) content of 50 mol % or less.

In sum, various evaluations presented in FIGS. 5A to 5D confirmed that the lower layer 103a of the second dielectric layer 103 is preferably composed of indium oxide (In$_2$O$_3$) or ITO having a tin oxide (SnO$_2$) content of 50 mol % or less from the standpoint of defect increase rate. Note that the upper layer 103b of the second dielectric layer 103 is composed of gallium oxide (Ga$_2$O$_3$).

The present disclosure contains subject matter related to that disclosed in Japanese Priority Patent Application JP 2010-170885 filed in the Japan Patent Office on Jul. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:
   a support substrate; and
   a semi-transmissive recording layer including (a) a first dielectric layer, (b) a semi-transmissive semi-reflective layer, (c) a second dielectric layer, (d) a phase change recording material layer, and (e) a third dielectric layer that are sequentially stacked in that order on the support substrate,
   wherein,
      the semi-transmissive semi-reflective layer contains silver,
      the second dielectric layer has a stack structure including a lower layer disposed on the semi-transmissive semi-reflective layer and an upper layer disposed on the lower layer,
      the lower layer is composed of indium oxide or a composite oxide of indium oxide and tin oxide, and
      the upper layer is composed of tantalum oxide, gallium oxide, zirconium oxide, or niobium oxide.

2. The optical recording medium according to claim 1, wherein the lower layer in the second dielectric layer is composed of a composite oxide of indium oxide and 50 mol % or less of tin oxide.

3. The optical recording medium according to claim 1, wherein the phase change recording material layer is composed of at least one of germanium, bismuth, antimony, and tellurium.

* * * * *